United States Patent [19]

Oneda

[11] Patent Number: 4,897,735
[45] Date of Patent: Jan. 30, 1990

[54] IMAGE PROCESSING APPARATUS FOR MULTI-MEDIA COPYING MACHINE

[75] Inventor: Shogo Oneda, Yokohama, Japan

[73] Assignee: Ricoh Company, Ltd., Tokyo, Japan

[21] Appl. No.: 263,517

[22] Filed: Oct. 27, 1988

[30] Foreign Application Priority Data

Oct. 28, 1987 [JP] Japan .................. 62-270405

[51] Int. Cl.$^4$ .................................... H04N 1/040
[52] U.S. Cl. .................... 358/449; 358/403; 358/442
[58] Field of Search ............ 358/280, 256, 257, 293, 358/400, 434, 494, 403, 449, 452, 488, 404

[56] References Cited

U.S. PATENT DOCUMENTS

| | | | |
|---|---|---|---|
| 4,445,195 | 4/1984 | Yamamoto | 358/256 |
| 4,506,302 | 3/1985 | Kurata | 358/293 |
| 4,604,653 | 8/1986 | Shimizu | 358/280 |
| 4,631,596 | 12/1986 | Yaguclin | 358/256 |
| 4,691,237 | 9/1987 | Shimizu | 358/280 |
| 4,704,636 | 11/1987 | Yano | 358/257 |
| 4,712,139 | 12/1987 | Kato | 358/257 |
| 4,760,608 | 7/1988 | Suzuki | 358/280 |
| 4,774,590 | 9/1988 | Haganuma et al. | 358/280 |
| 4,814,894 | 3/1989 | Yoshida | 358/449 |

Primary Examiner—Edward L. Coles, Sr.
Assistant Examiner—Kim Y. Yu
Attorney, Agent, or Firm—Oblon, Spivak, McClelland, Maier & Neustadt

[57] ABSTRACT

An image processing apparatus for a multi-media copying machine implements not only a paper-to-paper copying function but also a floppy disk-to-paper and a paper-to-floppy disk copying function. In a disk-to-paper copy mode, when the size of papers to be used is different from a paper size which is stored in a floppy disk, character data of a document stored in the disk are edited and printed in conformity to the size of papers.

5 Claims, 14 Drawing Sheets

IMAGE PROCESSING APPARATUS FOR MULTI-MEDIA COPYING MACHINE

BACKGROUND OF THE INVENTION

The present invention relates to an image processing apparatus and, more particularly, to an image processing apparatus applicable to a so-called multi-media copying machine having not only a function of copying a paper document on a paper which is the major function of an ordinary digital copier but also a function of copying a medium of one kind on a medium of another kind.

A recent achievement in the realm of imaging art is a multi-media copying machine having the above-described functions. A specific function available with such a copier is reproducing data stored in a floppy disk on a paper. In general, document files stored in a floppy disk by a computer or a word processor have a particular data format which in many cases depends upon the type of the computer or word processor. Therefore, the disk-to-paper copying function or the paper-to-disk copying function stated above cannot be implemented unless use is made of a computer or a word processor which was used to store data files in that floppy disk and an image scanner or a printer. Difficulty has heretofore been experienced in implementing such a kind of copying operation. Further, document files accommodated in a floppy disk or similar medium are generally formatted in a particular paper size and, hence, data in the disk cannot be reproduced on a paper of different size without editing the data again by using a computer or a word processor which was used to file such data.

SUMMARY OF THE INVENTION

It is therefore an object of the present invention to provide an improved image processing apparatus applicable to a multi-media copying machine having a capability of copying a medium of one kind on a medium of another kind.

It is another object of the present invention to provide an image processing apparatus applicable to a multi-media copying machine which implements copying operations between a floppy disk, a paper, and a document in the form of a paper.

It is another object of the present invention to provide an image processing apparatus applicable to a multi-media copying machine which allows document data stored in a floppy disk to be reproduced on a paper even if the former is different in size from the latter.

It is another object of the present invention to provide an image processing apparatus applicable to a multi-media copying machine which, in a disk-to-paper copy mode and when document data stored in a floppy disk and a paper are different in size from each other, edits the document data in conformity to the size of the paper.

It is another object of the present invention to provide a generally improved image processing apparatus for a multi-media copying machine.

An image processing apparatus of the present invention comprises as image reading unit for reading a predetermined image to convert the image into an electric signal, an image forming unit for forming an image on a paper based on the image signal, a data file reading unit for reading a data file which is stored in an external storage medium, a signal converting unit for converting the data file read by the data file reading unit into an image signal for the image forming unit to form an image, a size sensor for sensing a size of the paper, and an editing device for editing the data file readout of the external storage medium in conformity to the size of the paper sensed by the size sensor.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Preferred embodiments of the image processing apparatus in accordance with the present invention will be described with reference to the accompanying drawings. In the following description, an external storing medium is assumed to be a floppy disk by way of example.

Figure 1:
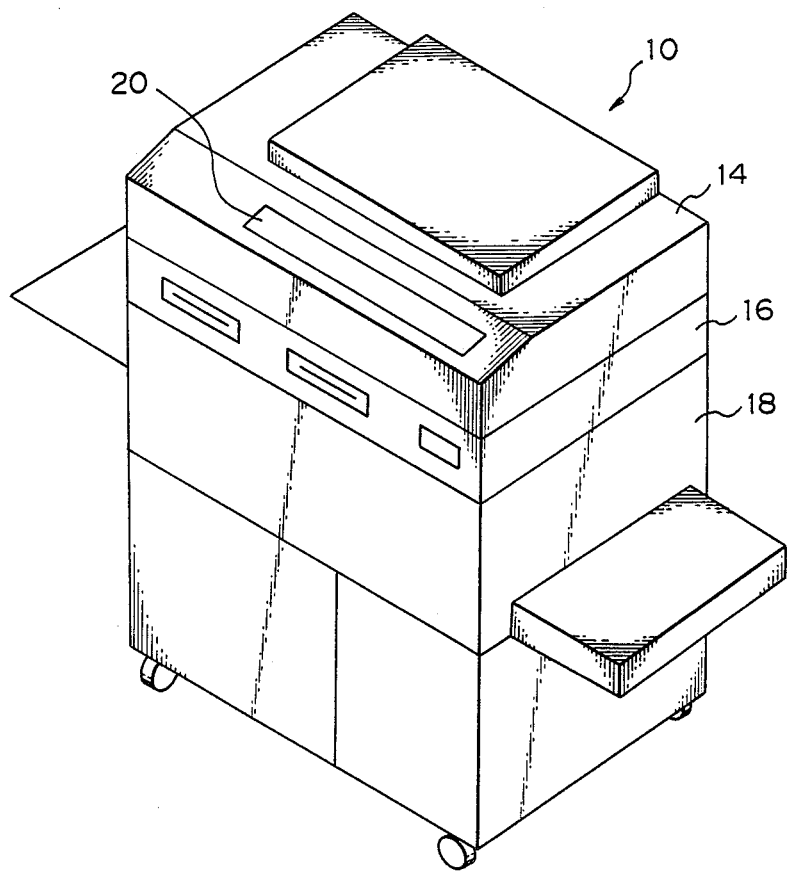
FIG. 1 is a perspective view of a multi-media copying machine to which one embodiment of the image processing apparatus in accordance with the present invention is applied.
Figure 2:
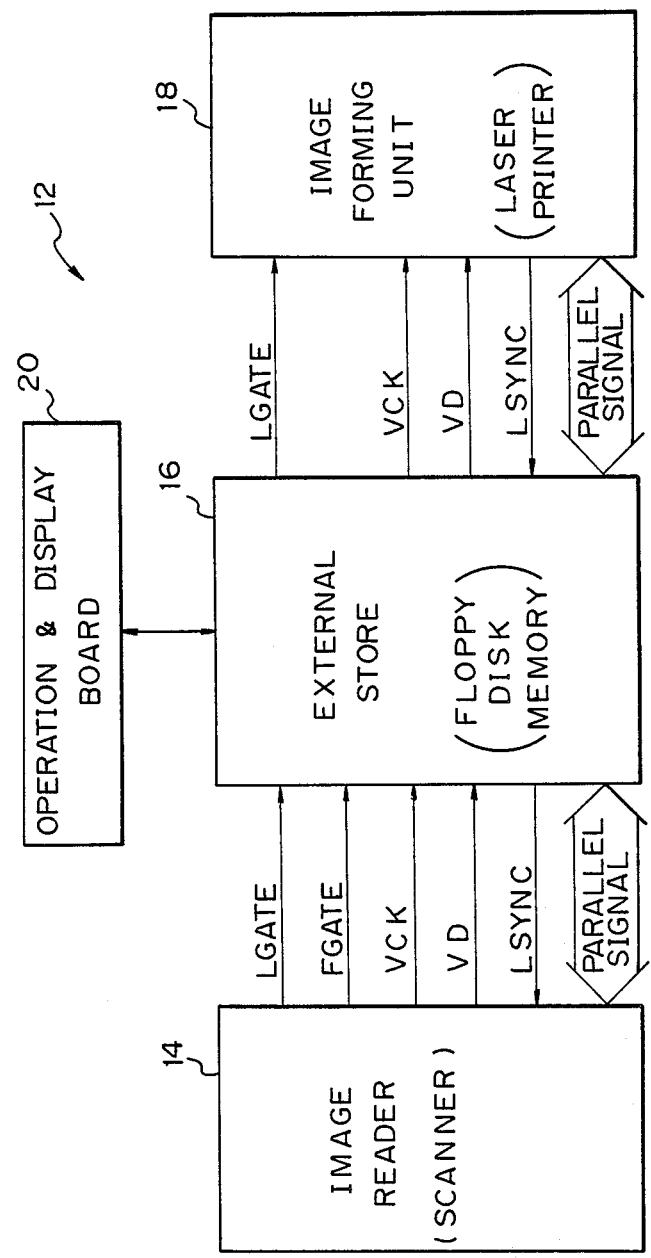
FIG. 2 is a schematic block diagram showing a control system which is installed in the copier of FIG. 1.

Referring to FIG. 1, a multi-media copying machine to which the present invention is applied is shown and generally designated by the reference numeral 10. FIG. 2 shows in a block diagram a control system which is installed in the copying machine. As shown, the control system 12 generally comprises an image reader (scanner) 14, an external store (floppy disk memory of FDM) 16, an image forming device (printer) 18, and an operation and display board 20. Although referred to as an "external" memory, the floppy disk is physically present within the unit 10 along with the scanner and printer. Serving as an input section of the copier 10, the scanner 14 converts image data associated with an original document into an electric signal (image signal) by charge-coupled devices (CCDs) or similar imaging devices. The original document is laid on a glass platen (not shown) of the copier 10. The FDM 16 is adapted to record the image signal from the scanner 14 and reproduced the image signal or an image signal recorded by another system (e.g. raster data, vector data or text data). The FDM 16 has thereinside a page memory, a scanner interface, a printer interface, and an operation and display interface to implement the control over the entire system 12 and the buffering of an image signal. FIG. 2 also shows a number of signals which pass between the blocks.

Figure 3:
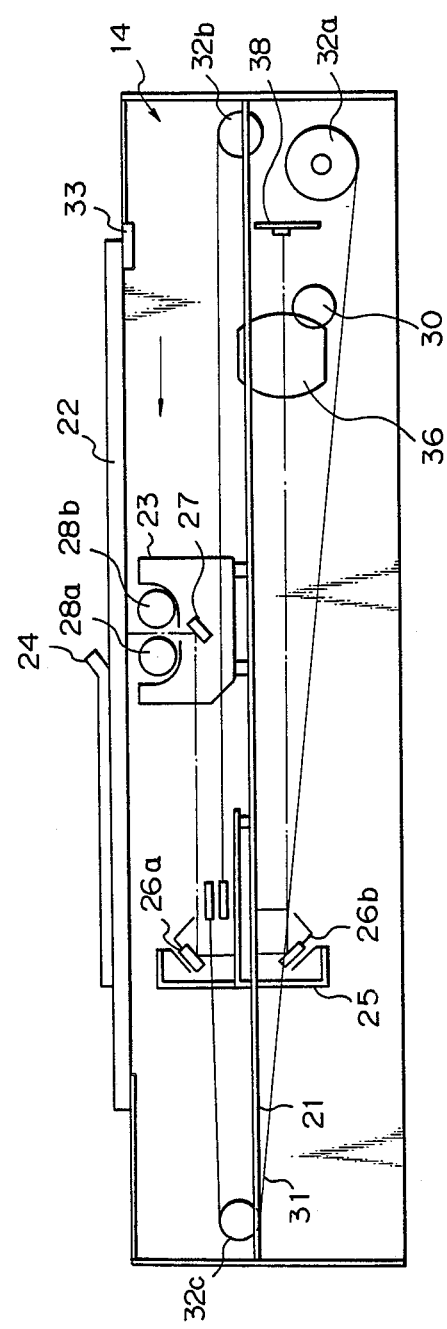
FIG. 3 is a view schematically showing a specific construction of an image reader which is included in the copier of FIG. 1.

FIG. 3 shows a specific construction of the scanner 14. An original document 24 is laid on a glass platen 22. Light sources (fluorescent lamps) 28a and 28b are mounted on a carriage 23 which is movable on and along slide rails 21, the document 24 being illuminated by the light sources 28a and 28b. A movable mirror unit 25 includes mirrors 26a and 26b and moves on and along the slide rails 21. Cooperating with a first mirror 27 provided on the carriage 23, the mirror unit 25 directs imagewise reflection from the document 24 to a reading unit 29. The carriage 23 and movable mirror unit 25 are driven in the same direction as each other by pulleys 32a, 32b and 32c which are in turn driven by a stepping motor 30 through a wire 31, the carriage 23 being moved at a speed of V and the mirror unit 25 at a speed of ½ V. A reference white plate 33 is provided on the back of a home position portion of the platen glass 22 so that a reference white signal may be produced before the start of an actual scanning stroke. The reading unit 29 comprises a lens 36 and a CCD line sensor 38 which is mounted on a base plate of the reading unit 29. Imagewise light incident to the lens 36 via the first mirror 27 and mirrors 26a and 26b is focused by the lens 36 onto the light sensitive surface of the CCD line sensor 38. The CCD line sensor 38 converts the density of the document image into an electric signal (image signal).

Figure 4:
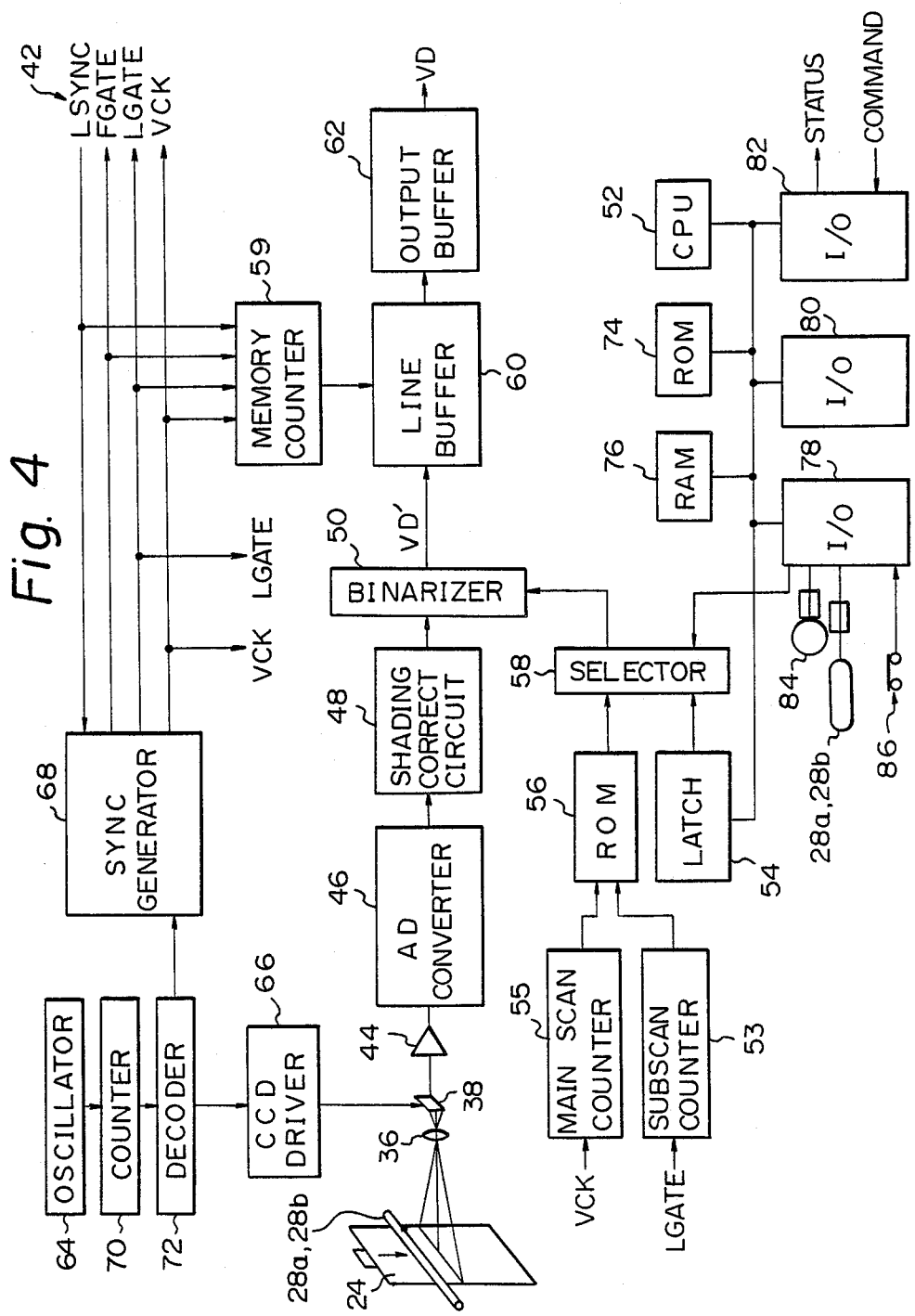
FIG. 4 is a schematic block diagram representative of an image signal processing circuit.

Referring to FIG. 4, a basic arrangement of a circuit built in the scanner 14 is processing an image signal is shown. The image processing circuit, generally 42, includes an amplifier 44 for amplifying an image signal which is outputted by the CCD line sensor 38. The image signal from the amplifier 44 is applied to an analog-to-digital (AD) converter 46 to be converted into a multi-level digital image signal on a pixel basis. The digital image signal is fed to a shading correction circuit 48 which functions to remove shading ascribable to various causes such as irregular emissions from the light source, irregular luminance distributions of optics (mirrors and lens), and irregular sensitivity of CCDs 38. A binarizer 50 converts into definite two levels an image signal representative of characters, drawings and other similar images in which black and white are distinct. Specifically, a document select switch is provided on the operation and display board 20 (FIGS. 1 and 2) and accessible for selecting one or two different approaches: one which binarizes values computed by a central processing unit (52) with respect to a pattern level (threshold level) which is stored in a latch circuit (random access memory of RAM) 54, and the other which is applicable to pictures and the like having tones and uses a dither pattern stored in a read only memory (ROM) 56 for binarization.

One line of image data which have been binarized on a pixel basis as stated above are applied to a line buffer 60. Assuming that the scanner 14 is of A3 size and that the resolution regarding the lengthwise feed of A4 size (210 millimeters×297 millimeters) is 400 dots per inch, the line buffer 60 is constituted by a RAM having 297×16=4752 dots or bits. The serial video signal VD from the line buffer 60 is fed to the printer 18 (FIGS. 1 and 2) via an output buffer 62. An oscillator 64 delivers its output to a CCD drive 66 adapted to drive the CCDs 38 and a sync signal generator 68 adapted to generate a sync signal for the video (pixel) signal. In FIG. 5, LSYNC is representative of a laser beam position signal (scanning sync signal) associated with the printer 18. Outputs of the oscillator 64 are counted by a converter 70 whose output is in turn applied to a decoder 72. The CCD driver 66 responds to an output of the decoder 72 for generating pulses for driving the CCDs 38. In response to the output of the decoder 72, the sync generator 68 generates the video clock VCK in synchronism with the pixels, a main scanning sync signal LGATE associated with the main scanning direction, and a sub-scanning sync signal FGATE associated with the sub-scanning direction. The signals VCK, LGATE and FGATE are fed though a memory counter 59 to the line buffer 60.

The CPU 52 is operated according to a control program which is stored in a ROM 74. Connected to the CPU 52 are a working memory RAM 76, input/output (I/O) ports 78, 80 and 82, etc. The CPU 52 and the I/O ports 78 to 82 cooperate to control the entire scanner 14. More specifically, the I/O port 78 is assigned to the on/off control of actuators such as an actuator for the lamps 28a and 28b, and the sensing of sensors 86 which include a home position switch and a document sensor. The I/O port 82 serves as an interface for communicating with a control circuit which is built in the FDM 14, performing parallel data transfer by a handshake system.

Figure 5A:
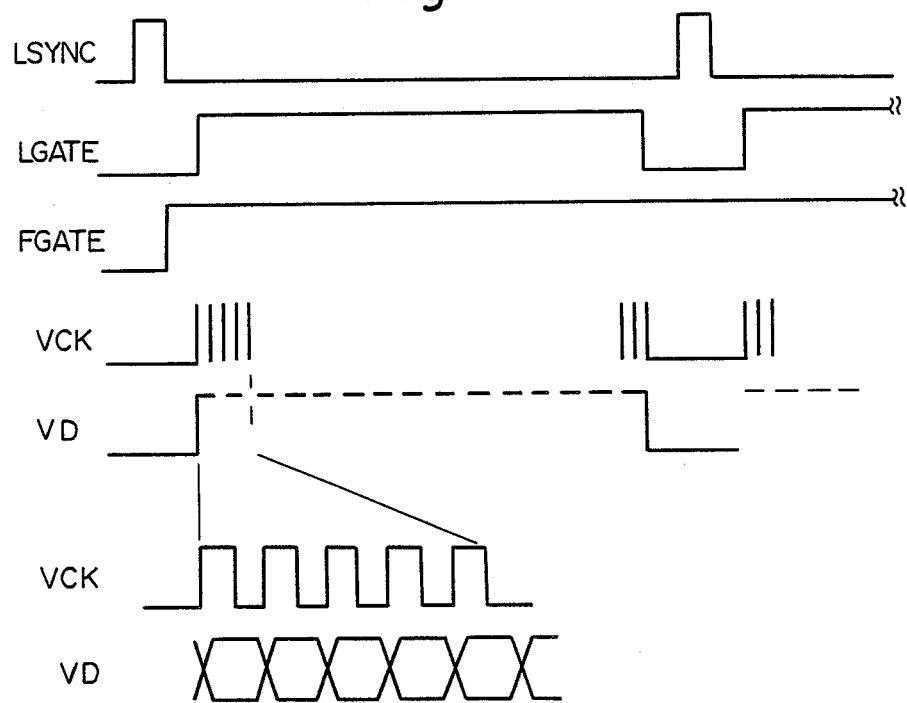
FIGS. 5A and 5B are charts useful for understanding operation timings of a scanner.
Figure 5B:
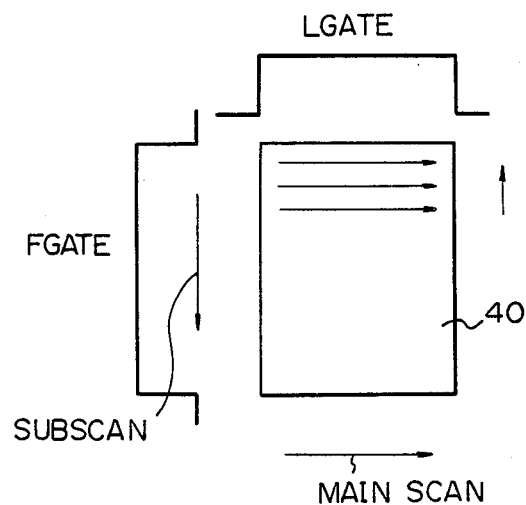

FIGS. 5A and 5B show a relationship between various signals which are associated with the scanner 14. In the timing chart of FIG. 5A, LSYNC and VD are respectively representative of a laser beam scanning sync signal outputted by the printer 18 and image data read (image signal) produced by the sync generator 68 and clocked by the video clock VCK. The video data Vd and the video clock VCK are shown in an enlarged schematic diagram in a lower part of FIG. 5A. FIG. 5B schematically shows a relationship between a paper and the main scanning signal LGATE and subscanning signal FGATE. As shown, the signals LGATE and FGATE are respectively associated with the widthwise direction and the lengthwise direction of a paper 40.

The FDM is constructed and operated as follows.

Figure 6:
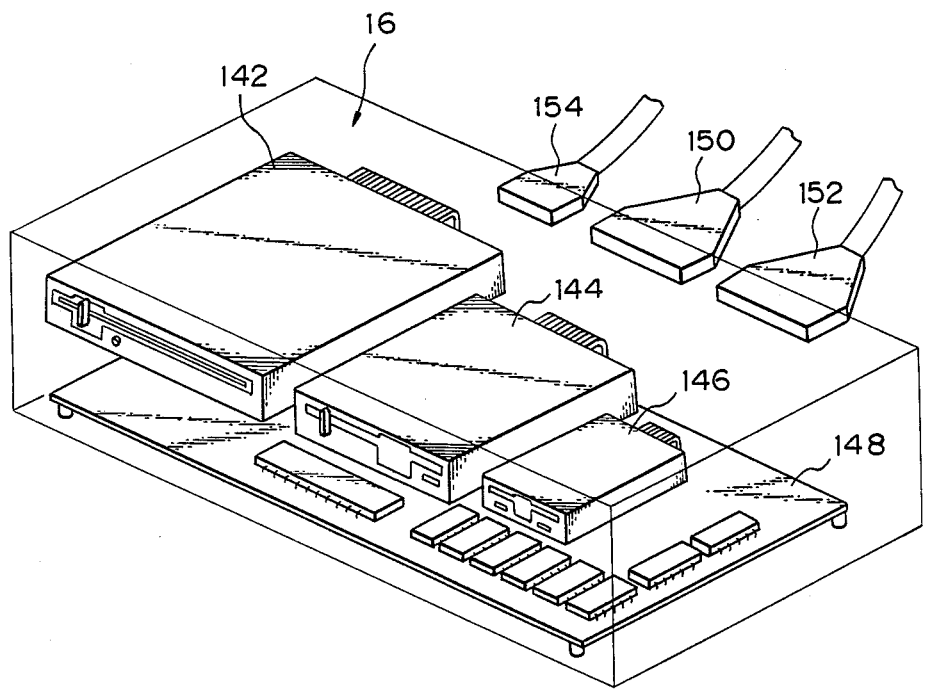
FIG. 6 is a perspective view schematically showing a floppy disk memory device.

Referring to FIG. 6, the FDM 16 is shown as comprising an 8-inch FDD 142, a 5.25-inch FDD 144, and a 3.5-inch FDD 146 by way of example. Alternatively, the FDM 16 may be loaded with one or more floppy disk devices having the same size, if desired. Also included in the FDM 16 are an electronic control circuit 148, an interface connector/cable 150 connected to the scanner 14, an interface connector/cable 152 connected to the printer 18, and an interface connector/cable 154 connected to the operation and display board 20.

Figure 7:
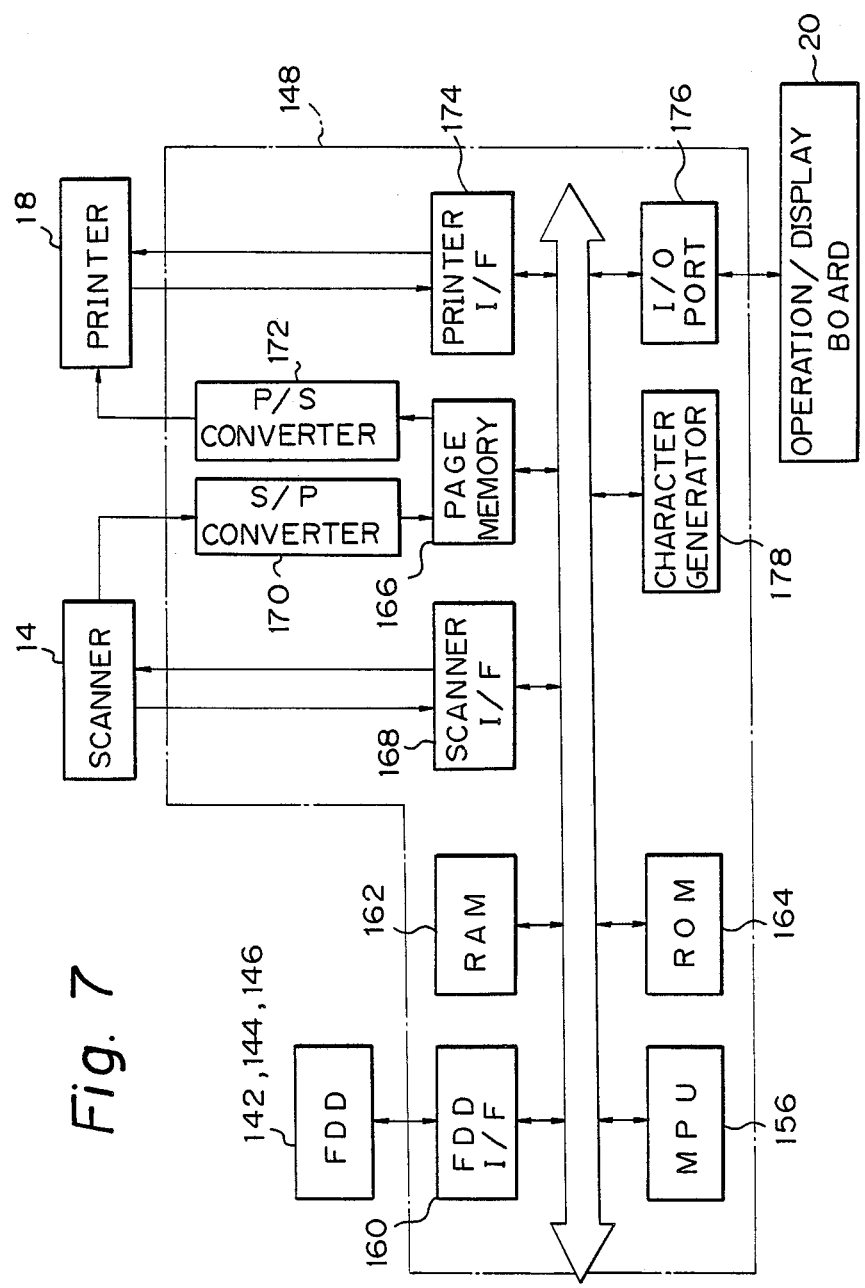
FIG. 7 is a schematic block diagram showing a control circuit for the floppy disk memory device.

FIG. 7 shows a control circuit built in the FDM 16. Basically implemented as a common microcomputer system, the control circuit controls each periphery by using a bus. In FIG. 7, the reference numeral 148 corresponds to the electronic control circuit 148 of FIG. 6. A microprocessor (MPU) 156 feeds a data signal, an address signal and a control signal to a bus 158. Physical controls (reading and writing) over the FDDs 142, 144 and 146 are effected via an FDD I/F 160. A working RAM 162 is operated by the MPU 156. A ROM 164 stores a program for controlling the FDDs 142, 144 and 146, printer 18, and page memory 166. A scanner I/F 168 is provided for controlling the operation of the scanner 14 and implemented by a parallel data interface. Data read by the scanner 14 are routed through a serial-to-parallel (S/P) converter 170 and not through the scanner I/F 168. Data from the S/P converter 170 are developed in the page memory 166 which has a capacity large enough to accommodate an output paper of the printer 18 in a full-dot image. Image data read out of the page memory 166 are transferred to the printer 18 via an S/P data converter 172. A printer I/F 174 is adapted for the operations of the printer 18 (e.g. print start and status read) and implemented as a parallel data interface. The printer I/F 174 is connected to the operation and display board 20 by an I/O port 176. Further included in the control circuit is a character generator 178.

Figure 8:
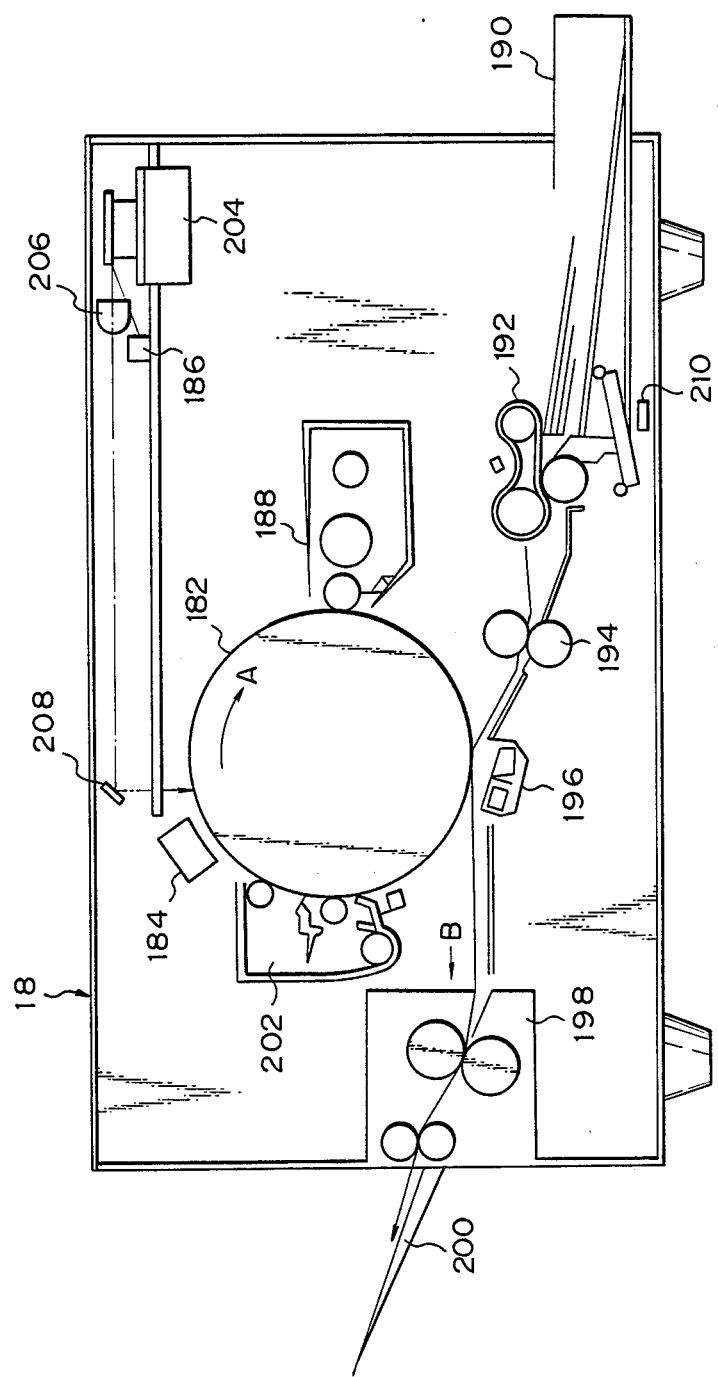
FIG. 8 is a schematic view showing a laser printer.

Referring to FIG. 8, a laser printer representative of the printer 18 and installed in the copying machine 10 is shown. A photoconductive drum 182 is rotated as indicated by an arrow A, charged by a charger 184, and exposed to an image produced by a laser 186 to form an electrostatic latent image. The latent image on the drum 182 is developed by toner which is supplied from a developing unit 188. A paper is fed from a cassette 190 by a paper feed section 192 and then driven by a register roller 194 at such a timing that the leading edge of the paper is brought into register with that of the toner image on the drum 182. When the paper is held in contact with the drum 182, a transfer charger 196 is energized to transfer the toner image from the drum 182 to the paper. The paper carrying the toner image thereon is transported in a direction indicated by an arrow B toward a fixing unit 198. After the toner image on the paper has been fixed by the fixing unit 198, the paper is driven out of the copier onto a copy tray 200. Toner remaining on the drum 182 after the image transfer is removed by a cleaning unit 202. Also shown in FIG. 8 are a polygonal mirror 204, an f-theta lens 206, a mirror 208, and a paper size sensor 210.

Figure 9:
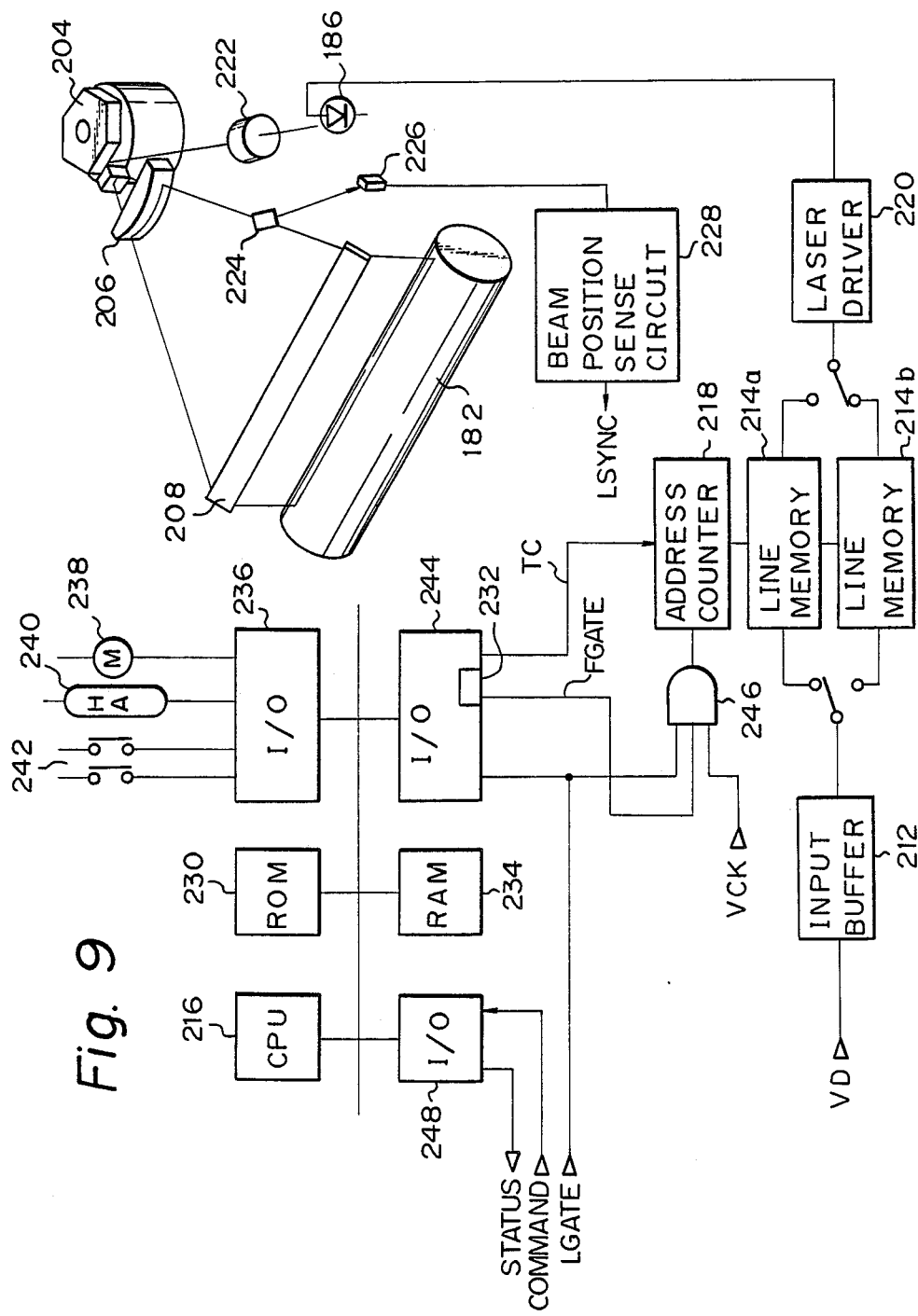
FIG. 9 is a block diagram schematically showing a control circuit associated with the laser printer.

Referring to FIG. 9, a specific construction of a circuit for controlling the laser printer 18 of FIG. 8 is shown. An image signal VD fed from the FDM 16 and synchronous to the sync signals LGATE, FGATE and VCK is applied to an input buffer 212 and then written in a line memory 214a or 214b. The line memories 214a and 214b are toggled by a toggle signal TC which is fed thereto from a CPU 216, i.e., one of the line memories 214a and 214b is held in a write condition while the other is in a read condition. An address counter 218 associated with the line memories 214a and 214b is incremented by the video clock VCK opened by the signal LGATE and is reset by the toggle signal TC, causing data to be written in and read out of the line memories 214a and 214b beginning at address zero continuously. The data read out of the memory such as the memory 214b are applied to a laser driver 220 which in turn controls the laser 186. A laser beam from the laser 186 is collimated by a collimator lens 222, then manipulated by the polygonal mirror 204 in the widthwise direction of the drum 182, then corrected by the f-theta lens 206 with respect to distortions, and then allowed to scan the drum 182.

The control circuit shown in FIG. 9 further includes a beam detecting mirror (BD mirror) 224, a beam position sensor 226, a beam position sensing circuit 228, a ROM 230 for storing control programs adapted for the control of the printer 18 and the control of an LGATE counter 232, a working RAM 234 associated with the CPU 216, an I/O port 236 to which a motor 238 for driving the printer 18, an actuator 240 for actuating a fixing heater and sensors 242 responsive to the presence/absence and rise of papers are connected, an I/O port 244 for counting input LGATE by using an LGATE counter 232 to apply FGATE to an AND gate 246 and outputting the toggle signal TC and other similar signals, and an I/O port 248 for interchanging control signals with the floppy disk I/O port 82 (FIG. 4) and the printer I/F 174 (FIG. 7). The CPU 216 is therefore operated by the ROM 230 which stores control programs as stated above. The CPU 216 informs the FDM 16 of the entry of a start and a stop command on the operation and display board 20, failures occurring in the printer 18 such as a paper jam, and a paper size selected by way of the I/O port 248.

Figure 10:
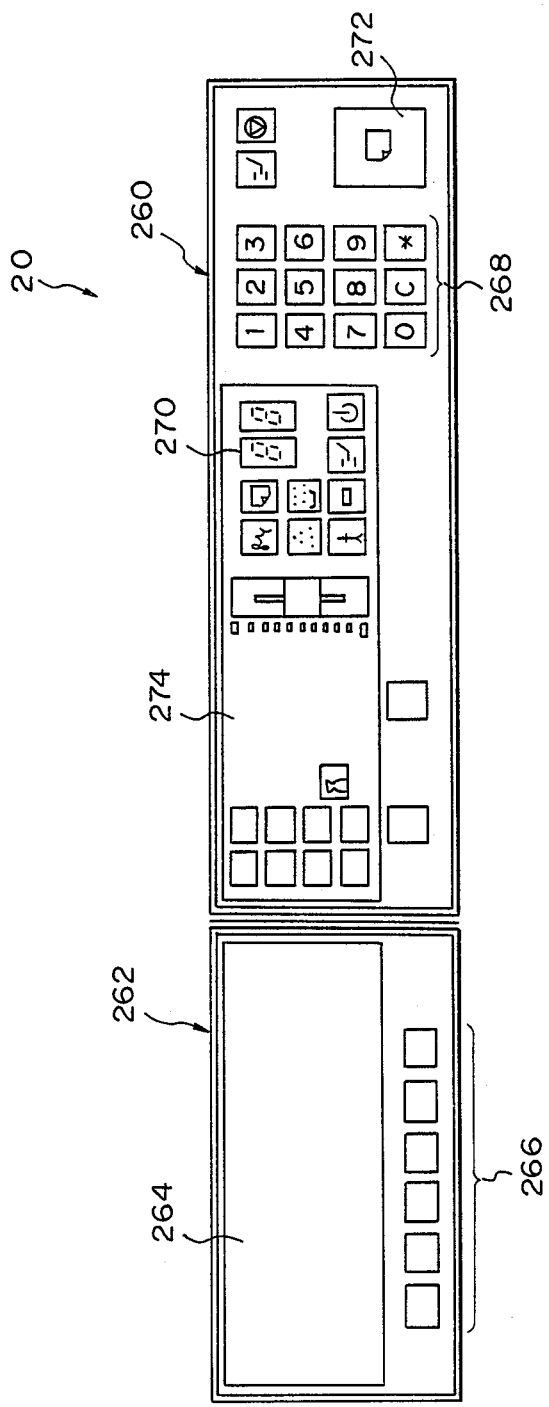
FIG. 10 is a schematic view showing an operation and display board.

Referring to FIG. 10, the operation and control board 20 includes a standard operating section 260 for operating the copier 10, and a special operating section 262 provided with a dot liquid crystal (LC) display 264 and function keys 266 accessible for entering data. Adapted for a paper-to-paper copy mode, the standard operating section 260 includes numeral keys 268 for entering a desired number of copiers, a copy number display 270, a print start key 272, and keys and indicators 274 for selecting and displaying copying conditions. The special operating section 262 is used in a copy mode for recording or reproducing data from the floppy disk 134. The function keys 266 and LC display 264 are connected to a microcomputer system via the I/O port 176 (FIG. 7) of the FDM 16. The significance of the function keys 266 and the data to be displayed on the display 264 are defined by programs which are stored in the microcomputer system.

The image processing apparatus having the above construction has three different capabilities as follows:

(1) "paper-to-paper" which is a conventional digital copying function and adapted to apply an image signal read by the scanner 14 to the printer 18;

(2) "paper-to-disk copy" adapted to record an image signal read by the scanner 14 in the floppy disk 134; and (3) "disk-to-paper copy" adapted to reproduce an image signal (raster data, vector data and test data being dealt with) from the floppy disk 134 and apply them to the printer.

The present invention is characterized in that in the disk-to-paper copy mode a document file stored in a floppy disk can be printed out on a paper in conformity to the size of a paper which is different from the size of the document file.

The paper-to-disk and disk-to-paper copying functions will be described hereinafter.

Paper-to-Disk Copy

Figure 11:
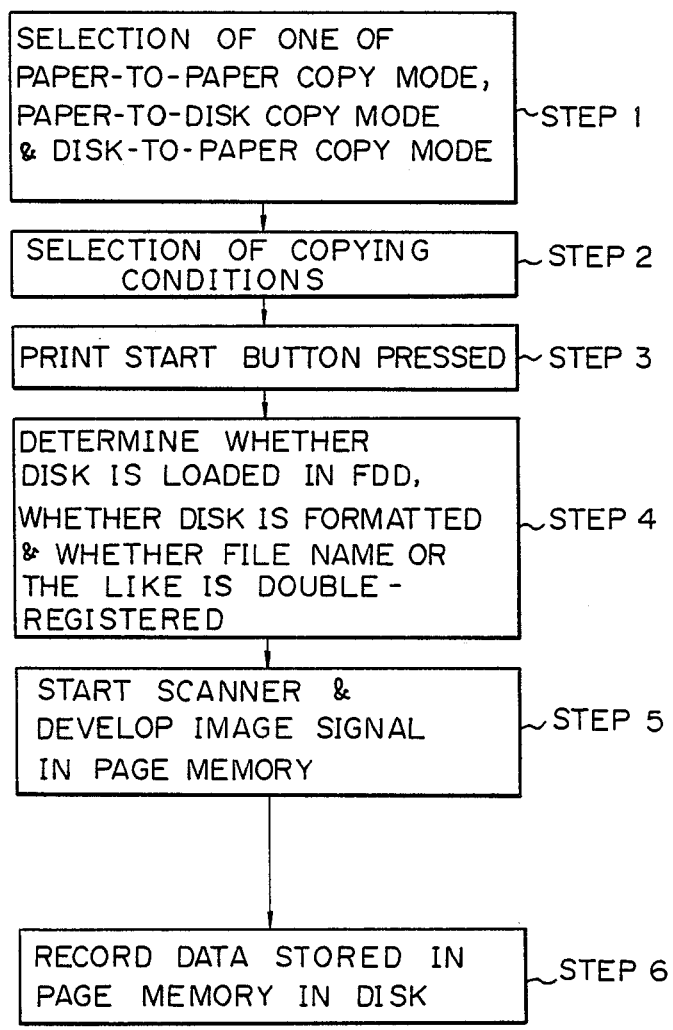
FIG. 11 is a flowchart demonstrating a paper-to-disk copying procedure.

Referring to FIG. 11, the paper-to-disk copying procedure is demonstrated in a flowchart. As shown, a document to be recorded in the floppy disk 134 is loaded on the scanner 14. Then, the operation and display board 20 shown in FIG. 10 is operated to set up a paper-to-disk copy mode (step 1), followed by the selection of copying conditions (step 2). The copying conditions may include a copying range, the kind of a floppy disk used, and a file number or a file name for the identification of a file stored in the floppy disk. The operation assigned to the operator ends with pressing the print start key 272 of FIG. 10 (step 3). More specifically, such copying conditions are sequentially entered on the function keys 266 of the special operating section 262 is visually guided by the LC display 264 which is connected to the ROM 164 of the FDM via the I/O port 176. As the print start key is pressed, the program checks the floppy disk via the FD I/F 160. Specifically, the program determines whether a floppy disk is loaded in the FDD, whether it has been formatted, whether the same file name or file number has been registered twice or more in the same floppy disk, etc. After so checking the floppy disk, the program executes read-out by the scanner 14 by way of the I/F 168. Data ready by the scanner 14 are sequentially developed in the page memory 166 via the S/P converter 170 (step 5). Since the page memory 166 has a capacity large enough to accommodate one full document, the development of data in the page memory 166 is continued until the entire document has been read. Subsequently, the content of the page memory 166 is recorded in the floppy disk (step 6). Such a recording operation is executed through the FD I/F 160.

Disk-to-Paper Copy

Figure 12:
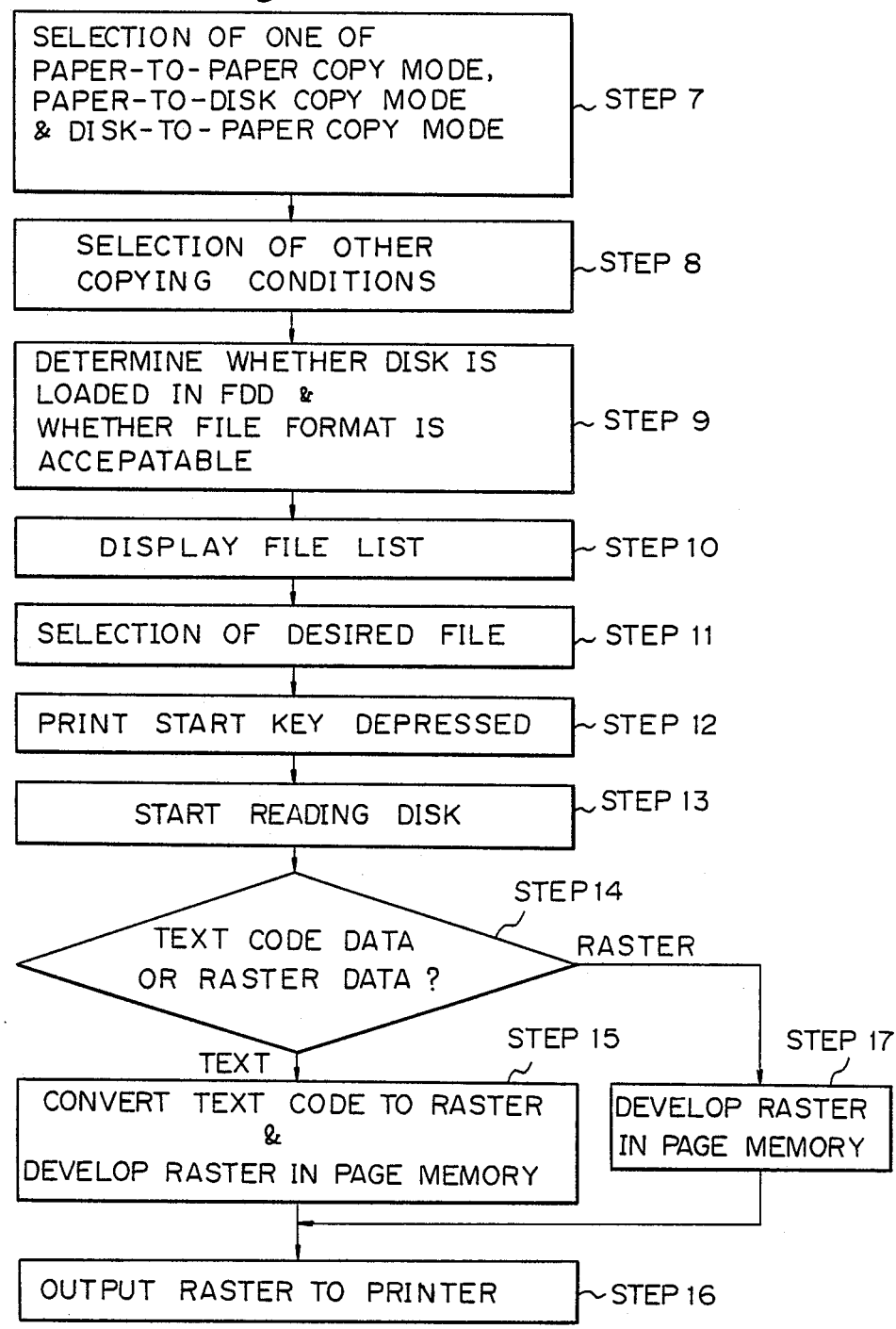
FIG. 12 is a flowchart demonstrating a disk-to-paper copying procedure.

FIG. 12 is a flowchart demonstrating the disk-to-paper copying procedure. First, a floppy disk containing a desired file is loaded in one of the FDDs which matches the floppy disk with respect to size. Then, the operation and display board 20 is operated to select the disk-to-paper copy mode (step 7), followed by the selection of copying conditions such as the size of the FDD (step 8). Again, the selection of copying conditions is effected by using the function keys 266 of the special operating section 262 as visually guided by the LC display 264 which is connected to the ROM 164 of the FDM via the I/O port 176. Therefore, the program stored in the ROM 164 checks the floppy disk through the FDD I/F (step 9), e.g., whether a floppy disk is present in the floppy disk drive and whether the file format is acceptable. After checking the floppy disk as started, the program displays a list of files which are contained in the floppy disk (step 10) while requesting the operator to select any of the files (step 11). When the files are text files, the first page of each file are bodily read out and the text data are written in the page memory 166 until the latter becomes full. The point is that the processing for file selection is executed at the same time. This is because disenabling the operator's access while the test data are developed in the page memory 166 is undesirable from the manipulation standpoint.

After the operator has selected a file and depressed the start key 272 (step 12), a FD read-out operation beings (step 13). If the data to be read are raster data as decided in a step 14, they are directly developed in the page memory 166 (step 17) and fed to the printer 18 (step 16). On the other hand, if the data are text code data as with a document file of a word processor, they are temporarily stored in the working RAM 162 to cause the character generator 178 to produce raster patterns associated with the codes and, then, the raster patterns are developed in the page memory (step 15). When all the raster patterns have been developed in the page memory 166, the content of the page memory 166 is printed out (step 16). If two or more copies are desired, the content of the page memory 166 will be fed to the printer 18 twice or more.

By the above sequence of steps, the content of a text file is red out of the floppy disk and fed to the printer 18.

In the event that the paper size recorded in the floppy disk is the same as the size of papers loaded in the printer 18, the content of the page memory 166 is printed out by the printer 18 in the size which is recorded in the floppy disk. However, when the two sizes are different from each other, the data are printed out after the format thereof has been edited again conformity to the size of papers.

How the floppy disk data are edited and printed out in conformity to the size of papers will be described. Generally, the printer 18 is operable with papers of two or more different sizes and provided with a paper cassette loaded with papers of a particular size or with paper cassettes each being loaded with a different size. When any of the paper cassettes is mounted in an operative position, exclusive sensing means automatically senses the size of papers which are loaded in the paper cassette. Alternatively, the size of papers to be used may be entered by an operator. In FIG. 8, the sensing means is designated by the reference numeral 210 and adapted to determine the size of papers as well as the longitudinal and lateral directions of the same (the size and the longitudinal and lateral directions are collectively referred to as a paper size herein). The format of data stored in the floppy disk are edited in conformity to the size of papers by using the MPU 156, RAM 162 and page memory 166 of FIG. 7 and according to a program which is stored in the ROM 164 in response to a paper size signal.

Figure 13:
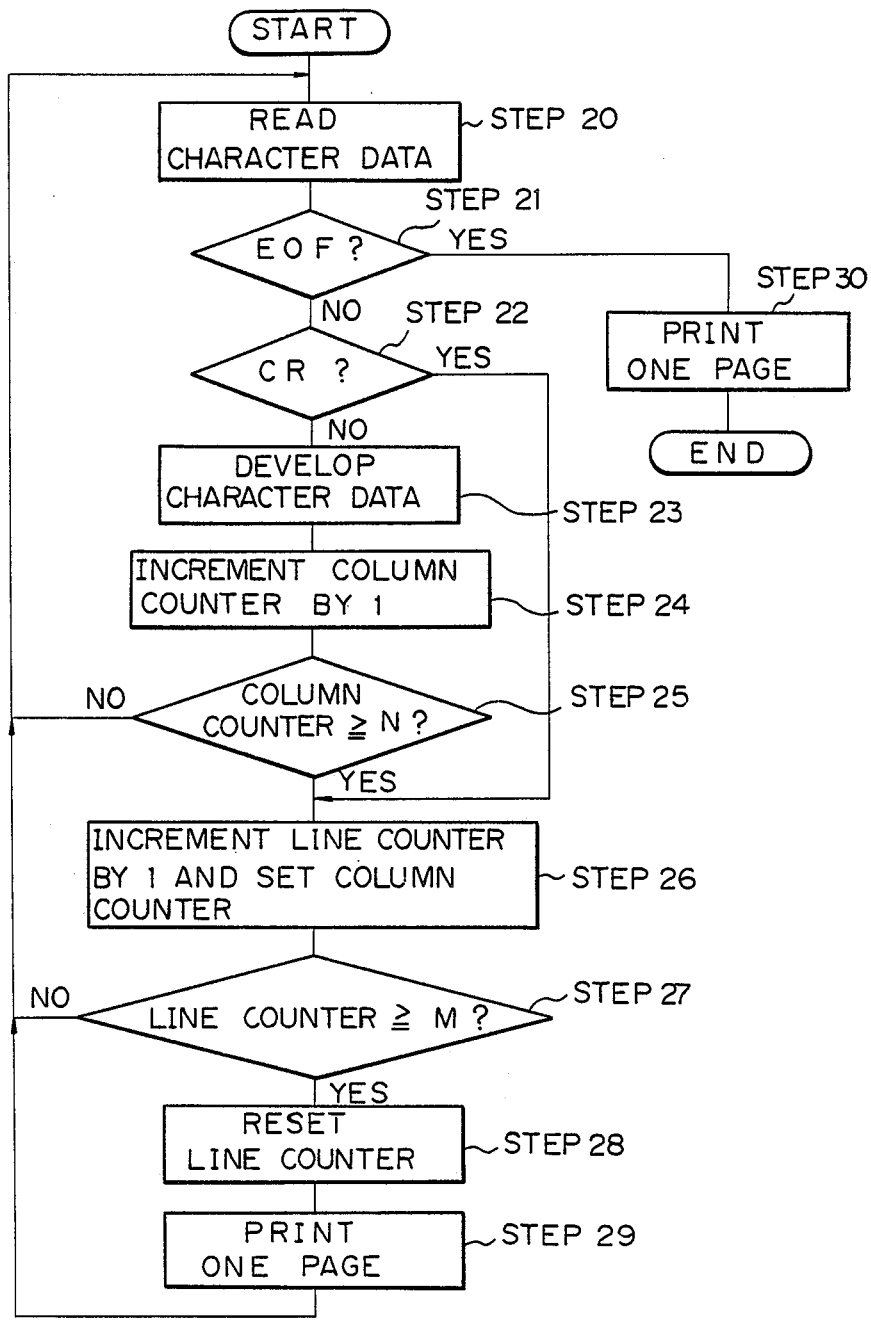
FIG. 13 is a flowchart representative of a procedure for printing out data in conformity to the size of a paper.

A reference will be made to FIG. 13 for describing the operation of the MPU 156 which occurs when the paper size recorded in the floppy disk and the size of papers loaded in the printer 18 are different from each other.

As the size of papers is sensed and loaded in the MPU 156, character data are read out of the floppy disk on a character basis and developed in the page memory 166 in a format which is associated with the size of papers (step 20). Then, if the code of a character read is an end-of-file (EOF) code is determined (step 21). If the answer is YES, one page of character data are read out of the page memory 166 and printed out,(step 30). If the result of decision in the step 21 is NO, whether the code is a carriage return (CR) code is determined (step 22) and, if it is a CR code, the program advances to a step 26. If the code is not a CR code, the character data are developed in the page memory 166 (step 23) and a register of the MPU 156, a column pointer of the work RAM 162 or a column pointer not shown is incremented by one (step 24). This is followed by comparing the value of the column register (or column pointer) with the maximum number N of characters which may be accommodated on one line (column) of a format associated with the size of papers (step 25). If the value of the column register is smaller than N, the program returns to the step 20 to perform processing for the next character. If the value of the column register is equal to or greater than N, a step 26 is executed to increment the line counter (or line pointer) by one and to reset the column counter (column pointer).

Thereafter, the value of the line counter (line pointer) is compared with the maximum number M of lines which may be accommodated in one page (step 27). If the value of the line counter is smaller than M, the program returns to the step 20 and, if the former is equal to or greater than M, the program advances to a step 28 for resetting the line counter (line pointer). After one page has been printed out (step 29), the operation returns to the step 20 to execute processing for the next character. It is to be noted that data representative of one character are developed in a particular location of the page memory 166 which is designated by the column counter (column pointer) and line counter (line pointer).

Figure 14A:
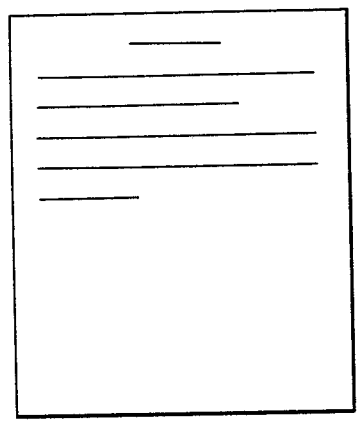
FIGS. 14A and 14B show a relationship between the size of a document stored in a floppy disk and the size of a paper for reproducing the document.
Figure 14B:
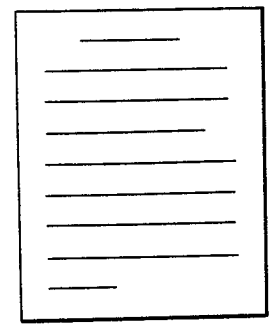
Figure 15A:
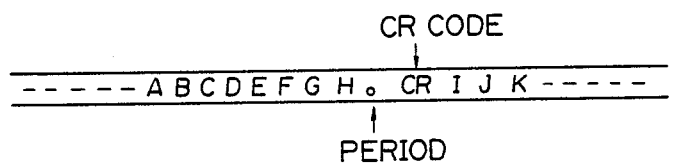
FIGS. 15A to 15C show a specific manner of editing character data stored in a floppy disk at the instant when they are to be printed out on a paper.
Figure 15B:
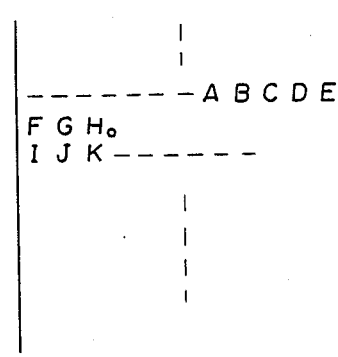
Figure 15C:
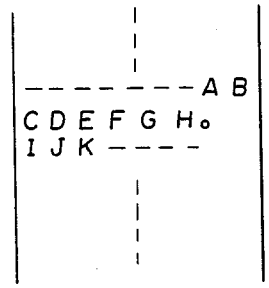

Assume that a document stored in a floppy disk in a format shown in FIG. 14A is printed out on a paper shown in FIG. 14B by way of example. Also, assume that character data of an original document shown in FIG. 15A are stored in the floppy disk in a format shown in FIG. 15B, and that the maximum number of characters per line which is determined by the size of papers is reached when the character data have been developed in the page memory 166 up to the character "B". Then, the column counter (column pointer) indicates the maximum number of characters per line and, hence, the character "C" is developed at the leading end of the next line (FIG. 15C). After the carriage has been returned in response to the CR code, characters are sequentially developed on the next line in the order of "I", "J", "K"...

While the above description has concentrated on papers whose size is smaller than the paper size which is stored in a floppy disk, the same is true for papers which are smaller in size than the paper size stored in a floppy disk.

In summary, it will be seen that the present invention provides an image processing apparatus which implements not only a paper-to-paper copying function but also a disk-to-paper and a paper-to-disk copying function. Furthermore, in a disk-to-paper copy mode, the apparatus allows character data of a file stored in a floppy disk to be edited before print-out in conformity to the size of papers which is different from a paper size recorded in the floppy disk.

Various modifications will become possible for those skilled in the art after receiving the teachings of the present disclosure without departing from the scope thereof.

What is claimed is:

1. An image processing apparatus comprising:
   image reading means for reading a predetermined image to convert the image into an electric signal;
   image forming means for forming an image on a paper based on the image signal;
   data file reading means for reading a data file which is stored in an external storage medium;
   signal converting means for converting the data file read by said data file reading means into an image signal for said image forming means to form an image;
   size sensing means for sensing a size of the paper; and
   editing means for editing the data file read out of the external storage medium in conformity to the size of the paper sensed by said size sensing means.

2. An image processing apparatus as claimed in claim 1, wherein said external storage means comprises a floppy disk.

3. An image processing apparatus as claimed in claim 2, wherein said data file reading means comprises a floppy disk memory device.

4. An image processing apparatus as claimed in claim 3, wherein said floppy disk memory device comprises control means including a page memory.

5. An image processing apparatus as claimed in claim 1, wherein said size sensing means automatically senses a size of papers when a paper cassette loaded with the papers is set in an operative position.

* * * * *